(12) United States Patent
Zhao et al.

(10) Patent No.: US 9,872,002 B2
(45) Date of Patent: Jan. 16, 2018

(54) METHOD AND DEVICE FOR CONTROLLING PROJECTION OF WEARABLE APPARATUS, AND WEARABLE APPARATUS

(71) Applicant: BOE TECHNOLOGY GROUP CO., LTD., Beijing (CN)

(72) Inventors: Xingxing Zhao, Beijing (CN); Yanshun Chen, Beijing (CN); Qiushi Xu, Beijing (CN); Yaohui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 234 days.

(21) Appl. No.: 14/437,112

(22) PCT Filed: Aug. 26, 2014

(86) PCT No.: PCT/CN2014/085210
§ 371 (c)(1),
(2) Date: Apr. 20, 2015

(87) PCT Pub. No.: WO2015/165181
PCT Pub. Date: Nov. 5, 2015

(65) Prior Publication Data
US 2016/0301906 A1   Oct. 13, 2016

(30) Foreign Application Priority Data

Apr. 28, 2014  (CN) .......................... 2014 1 0175550

(51) Int. Cl.
*H04N 9/31*   (2006.01)
*H04N 13/02*  (2006.01)
*G01B 11/00*  (2006.01)

(52) U.S. Cl.
CPC .......... *H04N 9/3185* (2013.01); *G01B 11/00* (2013.01); *H04N 9/3155* (2013.01);
(Continued)

(58) Field of Classification Search
CPC .. G01B 11/00; H04N 13/0275; H04N 9/3155; H04N 9/3173; H04N 9/3176; H04N 9/3185; H04N 9/3188; H04N 9/3194
See application file for complete search history.

(56) References Cited

U.S. PATENT DOCUMENTS

| 8,228,315 | B1 | 7/2012 | Starner et al. |
| 2003/0043303 | A1 | 3/2003 | Karuta et al. |

(Continued)

FOREIGN PATENT DOCUMENTS

| CN | 1582459 A | 2/2005 |
| CN | 1888814 A | 1/2007 |

(Continued)

OTHER PUBLICATIONS

Second Chinese Office Action dated Feb. 2, 2016; Appln. No. 201410175550.7.

(Continued)

*Primary Examiner* — Kenneth Bukowski
(74) *Attorney, Agent, or Firm* — Ladas & Parry LLP; Loren K. Thompson

(57) ABSTRACT

A method and a device for controlling projection of a wearable apparatus, and a wearable apparatus are provided. With the projection method, a 3D profile of the object as projection screen is acquired by a 3D acquisition device disposed on the wearable apparatus; coordinates of vertices of the projection area on the object as projection screen are determined according to the acquired 3D profile of the object as projection screen; a projection plane is determined according to the determined coordinates of vertices; and the (Continued)

projection is controlled according to the angle between the projection plane and the center line of the projection view angle of the projection component, the distance between the geometrical center of the projection plane and the projection component and the 3D profile of the object as projection screen such that the projection picture projected by the projection component is clearly and steadily projection displayed in the projection area on the object as projection screen.

20 Claims, 3 Drawing Sheets

(52) U.S. Cl.
CPC ......... *H04N 9/3173* (2013.01); *H04N 9/3176* (2013.01); *H04N 9/3188* (2013.01); *H04N 9/3194* (2013.01); *H04N 13/0275* (2013.01)

(56) References Cited

U.S. PATENT DOCUMENTS

| | | |
|---|---|---|
| 2007/0058136 A1 | 3/2007 | Sakai |
| 2010/0103174 A1 | 4/2010 | Saraille et al. |
| 2010/0275719 A1 | 11/2010 | Ortmaier et al. |
| 2012/0182416 A1* | 7/2012 | Kawaguchi .......... H04N 9/3185 348/128 |
| 2012/0249409 A1* | 10/2012 | Toney .................... G06F 3/017 345/156 |
| 2013/0162814 A1 | 6/2013 | Shin |
| 2014/0002503 A1* | 1/2014 | Saigo .................... G06T 5/008 345/647 |
| 2015/0070663 A1* | 3/2015 | Watanuki ............. G03B 21/145 353/70 |

FOREIGN PATENT DOCUMENTS

| | | |
|---|---|---|
| CN | 1932635 A | 3/2007 |
| CN | 101522440 A | 9/2009 |
| CN | 101903140 A | 12/2010 |
| CN | 102193631 A | 9/2011 |
| CN | 103338342 A | 10/2013 |
| CN | 103974048 A | 8/2014 |
| KR | 20130074565 A | 7/2013 |
| KR | 1020130121526 A | 11/2013 |

OTHER PUBLICATIONS

International Search Report dated Jan. 30, 2015; PCT/CN2014/085210.
Written Opinion of the International Searching Authority; dated Jan. 30, 2015; PCT/CN2014/085210.
First Chinese Office Action dated Aug. 4, 2015; Appln. No. 201410175550.7.
Korean Examination Opinion dated Mar. 15, 2016; Appln. No. 10-2015-7013331.

* cited by examiner

METHOD AND DEVICE FOR CONTROLLING PROJECTION OF WEARABLE APPARATUS, AND WEARABLE APPARATUS

TECHNICAL FIELD

Embodiments of the present invention relate to a method and a device for controlling projection of a wearable apparatus, and a wearable apparatus.

BACKGROUND

With the rapid development of electronic technologies, various wearable electronic apparatuses are having more and more functions and becoming more and more user friendly, enabling users to have better experience while using wearable electronic apparatus. At present, intelligent wearable electronic apparatuses (also known as wearable apparatuses) have become a trend gradually. Provision of projection components on these wearable apparatuses may provide wearable apparatuses with the projection display function.

However, in implementing projection display with a wearable apparatus, since human body inevitably conduct some gesture regulation, relative position change between projection components of the wearable apparatus and the object as the projection screen would occur. Alternatively, if the object as the projection screen is also a surface of some organ such as the palm of a human body, the organ surface may experience problems such as distortion, which makes the projection pictures projected by the projection component of the wearable apparatus can not be displayed normally on the object's surface as the projection screen.

SUMMARY

At least one embodiment of the present invention provides a method and a device for controlling projection of a wearable apparatus and a wearable apparatus to implement normal projection display on a palm for projection pictures projected by the projection component provided on the wearable apparatus.

At least one embodiment of the present invention provides a method for controlling projection of a wearable apparatus that is provided with a projection component, which method includes: acquiring a 3D profile of an object as projection screen by a 3D acquisition device disposed on the wearable apparatus; determining coordinates of vertices of a projection area on the object as projection screen according to the acquired 3D profile of the object as projection screen; determining a projection plane according to the determined coordinates of the vertices; and controlling the projection according to an angle between the projection plane and a center line of an projection view angle of the projection component, a distance between a geometrical center of the projection plane and the projection component and the 3D profile of the object as projection screen.

At least one embodiment of the present invention further provides a device for controlling projection of a wearable apparatus that is provided with a projection component, which device includes: an acquisition module configured to acquire a 3D profile of an object as the projection screen by a 3D acquisition device disposed on the wearable apparatus; a determination module configured to determine coordinates of vertices of a projection area on the object as projection screen according to the 3D profile of the object as projection screen acquired by the acquisition module and determine a projection plane according to the determined coordinates of the vertices; and a control module configured to control the projection according to an angle between a center line of an projection view angle of the projection component and the projection plane determined by the determination module, a distance between a geometrical center of the projection plane and the projection component and the 3D profile of the object as projection screen.

At least one embodiment of the present invention provides a wearable apparatus including a projection component and any one of the devices for controlling projection of the wearable apparatus involved above.

BRIEF DESCRIPTION OF DRAWINGS

In order to explain the technical solution of embodiments of the present invention more clearly, accompanying drawings of the embodiments will be introduced briefly below. Obviously, the accompanying drawings in the following description only relate to some embodiments of the present invention rather than limiting the present invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
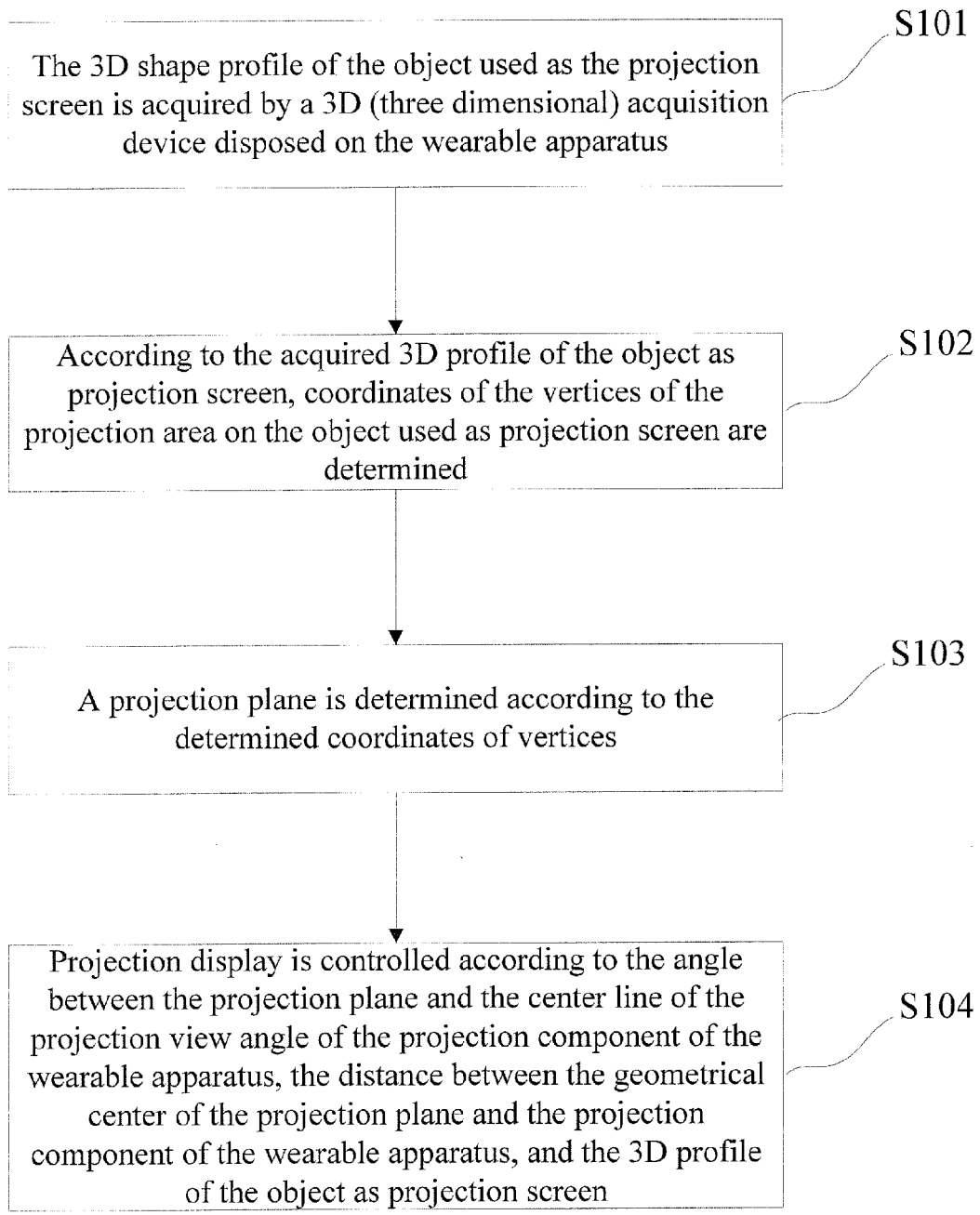
FIG. 1 is a flow chart of a method for controlling projection of a wearable apparatus provided in an embodiment of the present invention.

FIG. 1 shows an implementation flow chart of a method for controlling projection of a wearable apparatus provided in an embodiment of the present invention, including the following steps.

S101: The 3D shape profile of the object used as the projection screen is acquired by a 3D (three dimensional) acquisition device disposed on the wearable apparatus.

In at least one embodiment of the present invention, the 3D acquisition device disposed on the wearable apparatus may be a structured light three dimensional scanner, a binocular camera and a time of flight (TOF) detector. The 3D acquisition device may acquire coordinates of all points on the surface of the object as the projection screen in a three-dimensional coordinate system with the 3D acquisition device as the origin of the coordinates, and in turn can determine the 3D profile of the object as projection screen in the three-dimensional coordinate system with the 3D acquisition device as the origin of the coordinates.

According to the acquired position coordinates of the object as projection screen in the three-dimensional coordinate system that is established with the 3D acquisition device as the origin of the coordinates, it is possible to further determine the extent of deformation of the object as projection screen and determine the angular change, position change, etc. of the projection component on the wearable apparatus with respect to the object as projection screen.

S102: According to the acquired 3D profile of the object as projection screen, coordinates of the vertices of the projection area on the object used as projection screen are determined.

The shape of the projection area on the object as projection screen can be set according to practical situations, such as a circle, a rectangle etc. According to the shape of the projection area, it is possible to determine coordinates of vertices in different numbers. For example, in at least one embodiment of the present invention, to accommodate shapes of projection areas for most projector equipments, such as a rectangle, it is possible to select four vertices of the rectangular area such that the pattern formed by connecting the four determined vertices in order approximates a rectangle. Hereinafter, the determination of coordinates of four vertices to form a rectangular projection area will be described as an example; however, the present invention is not limited to this example.

The object as projection screen may be various projection medium suitable for projection display, for example, a palm. A palm is small compared to a common projection screen. In at least one embodiment of the present invention, the projection area determined on a palm is the biggest possible projection area on the palm. Therefore, the corresponding four vertices now may be the two edge points on the palm that are near wrist, the edge point near the little finger on the palm, and the edge point near the forefinger on the palm, which four edge points approximate as a rectangle after being connected in order.

S103: A projection plane is determined according to the determined coordinates of vertices.

Since the object as projection screen (such as a palm) may deform, the deformed projection screen may have determined vertices not in a same plane. A projection plane is determined according to the determined coordinates of vertices as the plane, in which the object as projection screen lies, so as to control the projection.

In at least one embodiment of the present invention, in order to display the projection picture precisely, a plane most close to the determined vertices is selected as the projection plane, and determination of the most close projection plane may be done in the following way. The plane with the minimum sum of variances of distances from the coordinates of determined vertices is determined as the projection plane.

S104: Projection display is controlled according to the angle between the projection plane and the center line of the projection view angle of the projection component of the wearable apparatus, the distance between the geometrical center of the projection plane and the projection component of the wearable apparatus, and the 3D profile of the object as projection screen, such that clear and steady projection display of the projection picture projected by the projection component of the wearable apparatus is realized in the projection area on the object as projection screen.

In at least one embodiment of the present invention, it is possible to adjust the shape of the projection picture projected by the projection component according to the angle between the projection plane and the center line of the projection view angle of the projection component such that the projection picture projected onto the object as projection screen adapts to the shape of the projection area on the object as projection screen. It is possible to adjust the size of projection picture projected by the projection component according to the distance between the geometrical center of the projection plane and the projection component such that the projection picture projected onto the object as projection screen adapts to the size of the projection area on the object as projection screen. The display luminance of the projection picture projected in the projection area on the object as projection screen is corrected/calibrated according to the 3D profile of the object as projection screen.

For example, if the projection field of view is of a rectangle, the center line of the projection view angle is the center line of the vertex angle formed by connecting the projection component with the four end points of the rectangle. If the projection field of view is a circle, the center line of the projection view angle is the center line of the bevel angle formed by connecting the projection component with the circle.

In at least one embodiment of the present invention, adapting the shape and size of a pattern to the angular change and distance change and adapting the display luminance of the projection picture to the 3D profile of the object as projection screen allows more precise adaptation of the abnormality of picture display resulting from the relative position change between the projection component of the wearable apparatus and the object as projection screen and the deformation of the object as projection screen.

In at least one embodiment of the present invention, adaptation of the shape of the projection picture projected by the projection component to the angle between the projection plane and the center line of the projection view angle of the projection component may be implemented by determining the correction angle for the keystone correction of the projection picture projected by the projection component according to the angle between the projection plane and the center line of the projection view angle of the projection component, and keystone correcting the projection picture projected by the projection component according to the determined correction angle, which allows simpler adaptation of the shape of the picture.

In at least one embodiment of the present invention, adaptation of the size of projection picture projected by the projection component to the distance between the geometrical center of the projection plane and the projection component may be implemented in the following way:

Determining a compression ratio for compressing the projection picture projected by the projection component according to the formula $$\phi = \frac{L\_1}{L\_0 * (d_1/d_0)}.$$

In the above-mentioned formula, $\Phi$ is the compression ratio for compressing the projection picture projected by the projection component, $L\_1$ is the size of the object as projection screen, $L\_0$ is a preset size of the projection screen, $d_1$ is the distance between the geometrical center of the projection plane and the projection component, $d_0$ is the distance between the corresponding geometrical center of the projection plane and the projection component when the size of projection area equals to the size of the projection screen. Once the compression ratio is determined, the size of the projection picture projected by the projection component is adjusted to the size of the projection picture projected by the projection component after being compressed according to the determined compression ratio.

In at least one embodiment of the present invention, compressing the projection picture by determining an appropriate compression ratio allows the adaptation of the size of projection picture in such a way that the projection picture can be completely projected in the projection area on the object as projection screen.

In at least one embodiment of the present invention, correcting the display luminance of the projection picture projected in the projection area on the object as projection screen according to the 3D profile of the object as projection screen may be implemented as follows:

Determining the display luminance of the projection picture in the projection area on the object as projection screen according to formula $L\_out(x,y)=L\_in(x,y)*\int(x,y,z)$; and correcting the display luminance of the projection picture projected in the projection area on the object as projection screen according to the determined display luminance, where $L\_out(x,y)$ is the display luminance of the projection picture at the location correspond to the coordinates (x,y) in the projection area on the object as projection screen, $L\_in(x,y)$ is the display luminance of the display picture projected at the coordinate point (x,y), $\int(x,y,z)$ denotes the integral of the three dimensional coordinate point in the 3D profile of the object as projection screen that correspond to the coordinate point (x,y) in the projection area on the object as projection screen.

In at least one embodiment of the present invention, the non-planar deformation of the object as projection screen is converted into a plane by an integral operation and the extent of deformation of the projection screen is determined through the integral operation, such that luminance may be adjusted accurately according to the extent of deformation of the object as projection screen.

With the method for controlling projection of a wearable apparatus provided in at least one embodiment of the present invention, coordinates of vertices of the projection area on the object as projection screen are determined according to the 3D profile of the object as projection screen acquired by the 3D acquisition device disposed on the wearable apparatus, a projection plane is determined according to the determined coordinates of vertices of the projection area, and the projection is controlled according to the angle between the projection plane and the center line of the projection view angle of the projection component, the distance between the geometrical center of the projection plane and the projection component, and the 3D profile of the object as projection screen, so that the projection picture projected by the projection component is projection-displayed in the projection area on a palm. That is, in at least one embodiment of the present invention, when the relative position between the projection component of the wearable apparatus and the object as projection screen changes, or when the object as projection screen deforms, it is possible to reflect the corresponding changes in the changes in the angle, the distance and the 3D profile of the object as projection screen and adjust and control the projection picture, such that the projection picture projected by the projection component on the wearable apparatus can be normally projection displayed clearly and steadily on the surface of the object as projection screen.

The method for controlling projection of a wearable apparatus involved in the above-mentioned embodiments will be described in detail below in connection with practical applications.

In at least one embodiment of the present invention, an intelligent finger ring as the wearable apparatus, and a palm as the object as projection screen will be described in an example, and the invention is not limited thereto of course. For example, the wearable apparatus may also be a wearable apparatus with projection display function such as an intelligent bracelet, an intelligent watch, a pair of intelligent glasses, while the object as projection screen may also be an object such as a wall, a table and an arm.

Figure 2:
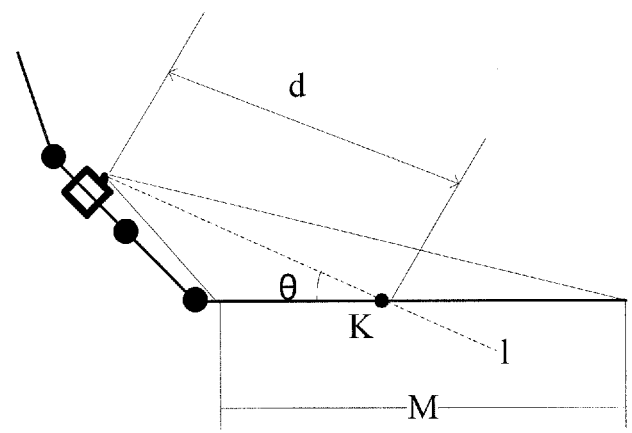
FIG. 2 is a schematic diagram of the angle and distance between an intelligent finger ring provided in an embodiment of the present invention and a palm.

The movement of a finger causes the change of projection angle of the projection picture projected by the intelligent finger ring on the finger and the change of distance between the intelligent finger ring and the palm. The angle change and the distance change will result in a change of the projection picture. The projection plane is determined in S103, which may be considered as the palm plane. Therefore, the angle between the center line of the projection view angle projected by the intelligent finger ring and the projection plane is defined as the angle between the intelligent finger ring and the palm plane, and the distance between the intelligent finger ring and the geometrical center of the projection plane is defined as the distance between the intelligent finger ring and the palm plane, as shown in FIG. 2. The projection picture may be adjusted and controlled with respect to the angle θ between the projection plane M and the center line l of the projection view angle and to the distance d between the geometrical center K of the projection plane and the intelligent finger ring, so as to accommodate the projection angle variation of the projection picture projected by the intelligent finger ring caused by finger motion, allowing normal projection display.

The deformation of palm results in a non-planar palm. Accordingly the projection picture projected onto the palm will deform. It is possible to determine the tilt angle of each point on the deformed palm with respect to the determined projection plane according to the 3D shape of the palm acquired by the 3D acquisition device. The amount of deformation at the corresponding position of the palm may be determined according to the tilt angle, and the pixel data at the corresponding position is corrected in turn to avoid picture distortion caused by the non-planar palm.

In at least one embodiment of the present invention, it is possible to adjust the shape of the projection picture projected by the intelligent finger ring according to the angle between the projection plane and the center line of the projection view angle such that the projection picture projected onto the palm adapts to the shape of the projection area; to adjust the size of the projection picture projected by the intelligent finger ring according to the distance between the geometrical center of the projection plane and the intelligent finger ring such that the projection picture projected onto the palm adapts to the size of the projection area on the palm; and to correct the display luminance of the projection picture projected in the projection area according to the 3D profile of the palm.

In at least one embodiment of the present invention, when the angle between the projection plane and the center line of the projection view angle changes, it is possible to adjust the shape of the projection picture projected by the intelligent finger ring with keystone correction; to determine a correction angle for keystone correction of the projection picture projected by the intelligent finger ring according to the angle between the projection plane and the center line of the projection view angle; and to keystone-correct the projection picture projected by the intelligent finger ring according to the determined correction angle.

The most common scenario for conventional keystone correction involves the oblique projection onto a projection screen that is still a plane. However, upon implementing projection onto a palm, the four vertices of the projection area on palm are most likely not in one plane. Therefore, a projection plane is determined according to the four vertices and then a correction angle for keystone correction is determined according to the angle between the projection plane and the center line of the projection view angle, such that the projection picture projected onto the projection area on the palm is normally displayed when the relative angle between the intelligent finger ring and the palm changes.

In at least one embodiment of the present invention, for example, the keystone correction approach in a projector may be applied for the keystone correction process such that the projection picture ultimately projected onto the projection area on the palm is normal despite of the possible distorted shape of the projection picture projected by the intelligent finger ring. A conventional keystone correction process may be utilized for the specific keystone correction process, which will not be described in detail in the embodiments of the present invention.

It is to be noted that, when the angle between the projection plane and the center line of the projection view angle changes, adjustment of the projecting angle of the intelligent finger ring to keep the projection picture steady is not limited to keystone correction, but also may be a physical/mechanical adjustment.

Figure 3:
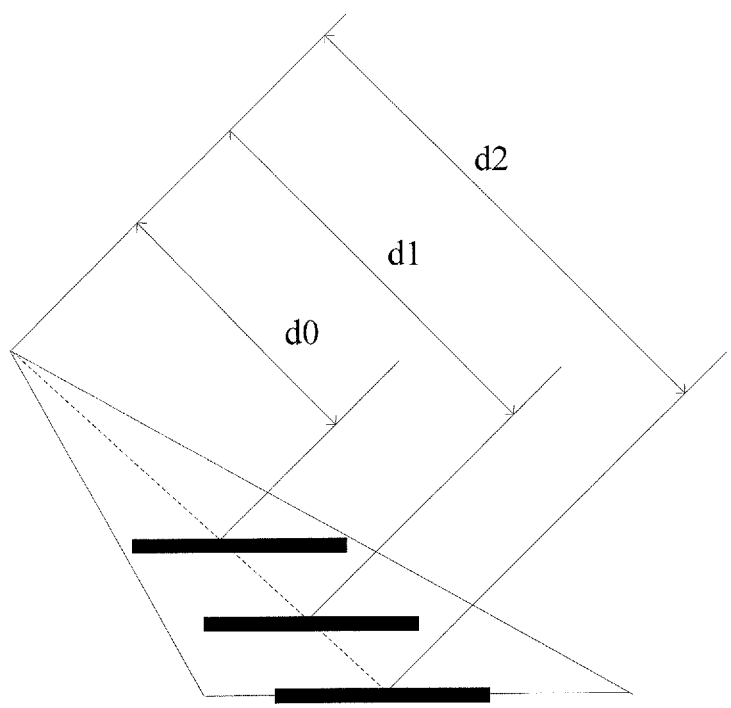
FIG. 3 is a schematic diagram of the size of a projection picture projected by the intelligent finger ring provided in an embodiment of the present invention.

Furthermore, when the distance between the geometrical center of the projection plane and the intelligent finger ring changes, the size of the projection picture projected onto the projection area might also change. As shown in FIG. 3, d0, d1 and d2 are distances between the geometrical center of the projection plane and the intelligent finger ring respectively. As can be seen in FIG. 3, when the size of palm is constant, while the distance between the geometrical center of the projection plane and the intelligent finger ring changes, part of the projection picture may not be projected onto the palm. Therefore, it is required to adjust the size of projection picture projected by the intelligent finger ring according to the distance between the geometrical center of the projection plane and the intelligent finger ring.

In at least one embodiment of the present invention, the original projection picture projected by the intelligent finger ring is generally of a fixed size. Since the projection area on the palm is generally small, in most cases, the projected picture will exceed the size of the palm when the distance between the intelligent finger ring and the palm changes. Therefore, it is possible to compress the projection picture projected by the intelligent finger ring at a proper proportion to project the projection picture onto the projection area on the palm.

For example, it is possible to determine a compression ratio for compressing the projection picture projected by the intelligent finger ring according to the formula $$\phi = \frac{L\_hand}{L\_0 * (d_1/d_0)}.$$

Then the size of the projection picture projected by the intelligent finger ring is adjusted to the size that is obtained after the projection picture projected by the intelligent finger ring is compressed according to the determined compression ratio. In the formula, Φ is the compression ratio for compressing the projection picture projected by the intelligent finger ring, L_hand is the size of a palm, L_0 is a preset size of the palm, $d_1$ is the distance between the geometrical center of the projection plane and the intelligent finger ring, and $d_0$ is the distance between the corresponding geometrical center of the projection plane and the intelligent finger ring when the projection area and the palm are of equal size.

In at least one embodiment of the present invention, correction of the display luminance of the projection picture in the projection area on the palm according to the 3D profile of the palm may be implemented in the following way:

Determining the display luminance of the projection picture in the projection area on palm according to the formula L_out(x,y)=L_in(x,y)*∫hand_plane(x,y,z); and correcting the display luminance of the projection picture in the projection area on palm according to the determined display luminance, where L_out (x,y) is the display luminance of the projection picture at the location corresponding coordinate point (x,y) in the projection area on palm, L-in (x,y) is the display luminance of the display picture projected at the coordinate point (x,y), ∫hand_plane (x,y,z) denotes the integral of the three dimensional coordinate point in the 3D profile of the palm that corresponds to the coordinate point (x,y) in the projection area on palm.

In at least one embodiment of the present invention, the tilt degree at the corresponding location with respect to the determined projection plane may be obtained by the integral operation of the coordinate point in the 3D profile of palm at the corresponding location, and the extent of deformation of palm may be further reflected. Adjusting the luminance according to the extent of deformation at different locations can adapt to the picture distortion caused by palm deformation, thereby realizing normal display of the picture.

With the method for controlling projection of a wearable apparatus provided in at least one embodiment of the present invention, coordinates of vertices of the projection area on the palm are determined according to the 3D profile of the object as projection screen acquired by the 3D acquisition device disposed on the intelligent finger ring, a projection plane is determined according to the determined coordinates of vertices of the projection area, and the projection is controlled according to the angle between the projection plane and the center line of the projection view angle of the intelligent finger ring, the distance between the geometrical center of the projection plane and the intelligent finger ring, and the 3D profile of the palm, so that the projection picture projected by the intelligent finger ring is projection-displayed in the projection area on the palm. That is, when the finger and the palm experience changes, it is possible to reflect corresponding changes in the changes of angle, the distance and the extent of deformation of palm, and adjust and control the projection picture such that the projection picture projected by the intelligent finger ring can be normally projection displayed on the palm.

Figure 4:
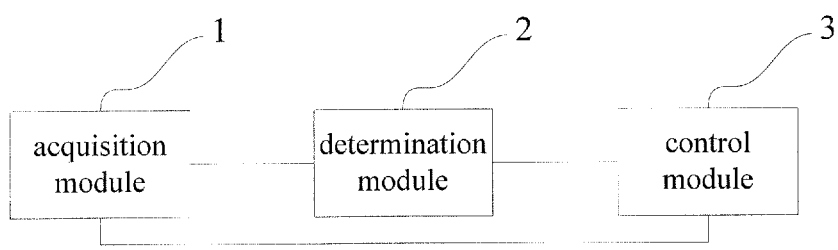
FIG. 4 is a schematic diagram of the construction of a device for controlling projection of a wearable apparatus provided in another embodiment of the present invention.

Based on the method for controlling projection of a wearable apparatus provided in the above-mentioned embodiments, at least one embodiment of the present invention further provides a device for controlling projection of a wearable apparatus as shown in FIG. 4, which includes an acquisition module 1, a determination module 2, and a control module 3, which may be realized in software, hardware, firmware, etc.

The acquisition module 1 is configured to acquire the 3D profile of the object as the projection screen by the 3D acquisition device disposed on the wearable apparatus.

The determination module 2 is configured to determine coordinates of vertices of the projection area on the object as projection screen according to the 3D profile of the object as projection screen acquired by the acquisition module 1 and determine a projection plane according to the determined coordinates of vertices.

The control module 3 is configured to control the projection according to the angle between the center line of the projection view angle of the projection component on the wearable apparatus and the projection plane determined by the determination module 2, the distance between the geometrical center of the projection plane and the projection component of the wearable apparatus and the 3D profile of the projection component, such that clear and steady projection display of the projection picture projected by the projection component of the wearable apparatus is realized in the projection area on the object as projection screen.

In at least one embodiment of the present invention, for example, the determination module 2 may be configured to determine the plane with the minimum sum of variances of distances from the determined coordinates of vertices as the projection plane.

In at least one embodiment of the present invention, for example, the control module 3 is configured to adjust the shape of the projection picture projected by the projection component according to the angle between the center line of the projection view angle of the projection component on the wearable apparatus and the projection plane determined by the determination module 2 such that the projection picture projected onto the object as projection screen adapts to the shape of the projection area on the object as projection screen; to adjust the size of the projection picture projected by the projection component according to the distance between the projection component on the wearable apparatus and the geometrical center of the projection plane determined by the determination module 2 such that the projection picture projected onto the object as projection screen adapts to the size of the projection area on the object as projection screen; and correct the display luminance of the projection picture projected onto the projection area on the object as projection screen according to the 3D profile of the object as projection screen.

In at least one embodiment of the present invention, for example, the control module 3 may be configured to determine a correction angle for the keystone correction of the projection picture projected by the projection component according to the angle between the projection plane and the center line of the projection view angle of the projection component; and to keystone-correct the projection picture projected by the projection component according to the determined correction angle.

Furthermore, for example, the control module 3 may be configured to: determine the compression ratio for compressing the projection picture projected by the projection component according the formula $$\phi = \frac{L\_1}{L\_0 * (d_1 / d_0)};$$

and to adjust the size of the projection picture projected by the projection component to the size after compressing the projection picture projected by the projection component according to the above-mentioned compression ratio, where $\Phi$ is the compression ratio for compressing the projection picture projected by the projection component, L_1 is the size of the object as projection screen, L_0 is a preset size of the projection screen, $d_1$ is the distance between the geometrical center of the projection plane and the projection component, and $d_0$ is the distance between the corresponding geometrical center of the projection plane and the projection component when the size of projection area equals the size of the projection screen.

For example, the control module 3 may be configured to: determine the display luminance of the projection picture in the projection area on the object as projection screen according to formula L_out(x,y)=L_in(x,y)*$\int$(x,y,z); and correct the display luminance of the projection picture projected in the projection area on the object as projection screen according to the determined display luminance, where L_out (x,y) is the display luminance of the projection picture at the location corresponding to coordinate point (x,y) in the projection area on the object as projection screen, L_in (x,y) is the display luminance of the display picture projected at the coordinate point (x,y), $\int$(x,y,z) denotes the integral of the three dimensional coordinate point in the 3D profile of the object as projection screen that correspond to the coordinate point (x,y) in the projection area on the object as projection screen.

The above-mentioned wearable apparatus in embodiments of the present invention is an intelligent finger ring, and the object as projection screen is a palm.

With the device for controlling projection of a wearable apparatus provided in at least one embodiment of the present invention, coordinates of vertices of the projection area on the object as projection screen are determined according to the 3D profile of the object as projection screen acquired by the 3D acquisition device disposed on the wearable apparatus, a projection plane is determined according to the determined coordinates of vertices of the projection area, and the projection is controlled according to the angle between the projection plane and the center line of the projection view angle of the projection component, the distance between the geometrical center of the projection plane and the projection component, and the 3D profile of the object as projection screen, so that the projection picture projected by the projection component is projection-displayed in the projection area on a palm. That is, when the relative position between the projection component of the wearable apparatus and the object as projection screen changes, or when the object as projection screen deforms, it is possible to reflect the corresponding changes in the changes of the angle, the distance and the 3D profile of the object as projection screen and adjust and control the projection picture, such that the projection picture projected by the projection component on the wearable apparatus can be normally projection displayed clearly and steadily on the surface of the object as projection screen.

Based on the method and device for controlling projection of a wearable apparatus involved in the above-mentioned embodiments, at least one embodiment of the present invention further provides a wearable apparatus including a projection component and a device for controlling projection of the wearable apparatus that is the device for the wearable apparatus involved in the above-mentioned embodiments.

In at least one embodiment of the present invention, in addition to the device for controlling projection of the wearable apparatus, other parts of the wearable apparatus are of the same structure as prior art ones, and will not be described any more herein.

It is to be noted that while an intelligent finger ring and a palm is described above as examples, those skilled in the art should appreciate that the present invention is not limited thereto. For example, the wearable apparatus may also be a wearable apparatus with projection display function such as an intelligent bracelet, an intelligent watch, a pair of intelligent glasses, while the object as projection screen may also be an object such as a wall, a table and an arm.

What are described above is related to the illustrative embodiments of the disclosure only and not limitative to the scope of the disclosure; the scopes of the disclosure are defined by the accompanying claims.

The present application claims priority of a China patent application No. 201410175550.7 filed on Apr. 28, 2014, which is incorporated in its entirety herein by reference as part of the present application.

The invention claimed is:

1. A method for controlling projection of a wearable apparatus that is provided with a projection component, comprising:
 acquiring a 3D profile of an object as a projection screen by a 3D acquisition device disposed on the wearable apparatus;
 determining coordinates of vertices of a projection area on the object as the projection screen according to the acquired 3D profile of the object as the projection screen;
 determining a projection plane according to the determined coordinates of the vertices; and
 controlling the projection according to an angle between the projection plane and a center line of an projection view angle of the projection component, a distance between a geometrical center of the projection plane and the projection component, and the 3D profile of the object as the projection screen,
 wherein a display luminance of a projection picture projected in the projection area on the object as the projection screen is corrected according to the 3D profile of the object as the projection screen at least by:
  determining an extent of deformation of the projection screen through a calculation operation including an integral operation that is related to the 3D profile of the object as the projection screen; and
  adjusting the display luminance of the projection picture according to the extent of deformation of the projection screen.

2. The method of claim 1, wherein a plane with a minimum sum of variances of distances from the determined coordinates of the vertices is determined as the projection plane.

3. The method of claim 2, wherein,
 a shape of the projection picture projected by the projection component is adjusted according to the angle between the projection plane and the center line of the projection view angle of the projection component such that the projection picture projected onto the object as the projection screen adapts to a shape of the projection area on the object as the projection screen; and
 a size of the projection picture projected by the projection component is adjusted according to the distance between the geometrical center of the projection plane and the projection component such that the projection picture projected onto the object as the projection screen adapts to a size of the projection area on the object as the projection screen.

4. The method of claim 3, wherein,
 a correction angle for keystone correction of the projection picture projected by the projection component is determined according to the angle between the projection plane and the center line of the projection view angle of the projection component; and
 the projection picture projected by the projection component is keystone-corrected according to the correction angle.

5. The method of claim 3, wherein,
 a compression ratio for compressing the projection picture projected by the projection component is determined according to a formula $$\phi = \frac{L\_1}{L\_0 * (d_1/d_0)};$$

a size of the projection picture projected by the projection component is adjusted to a size that is obtained after the projection picture projected by the projection component is compressed according to the compression ratio;
 where $\varphi$ is the compression ratio for compressing the projection picture projected by the projection component, $L\_1$ is the size of the object as the projection screen, $L\_0$ is a preset size of the projection screen, $d_1$ is a distance between the geometrical center of the projection plane and the projection component, and $d_0$ is a distance between the corresponding geometrical center of the projection plane and the projection component when the size of projection area equals the size of the projection screen.

6. The method of claim 3, wherein,
 the display luminance of the projection picture in the projection area on the object as the projection screen is determined according to a formula $$L\_out(x,y) = L\_in(x,y) * f(x,y,z);$$

the display luminance of the projection picture projected in the projection area on the object as the projection screen is corrected according to the determinate display luminance,
 where $L\_out(x, y)$ is the display luminance of the projection picture at the location corresponding to a coordinate point $(x, y)$ in the projection area on the object as the projection screen, $L\_in(x, y)$ is the display luminance of the display picture projected at the coordinate point $(x, y)$, and $f(x, y, z)$ denotes the integral operation and represents an integral of the three dimensional coordinate point in the 3D profile of the object as the projection screen that corresponds to the coordinate point $(x, y)$ in the projection area on the object as the projection screen.

7. The method of claim 1, wherein,
 a shape of the projection picture projected by the projection component is adjusted according to the angle between the projection plane and the center line of the projection view angle of the projection component such that the projection picture projected onto the object as the projection screen adapts to a shape of the projection area on the object as the projection screen; and
 a size of the projection picture projected by the projection component is adjusted according to the distance between the geometrical center of the projection plane and the projection component such that the projection picture projected onto the object as the projection screen adapts to a size of the projection area on the object as the projection screen.

8. The method of claim 7, wherein,
 a correction angle for keystone correction of the projection picture projected by the projection component is determined according to the angle between the projection plane and the center line of the projection view angle of the projection component; and the projection picture projected by the projection component is keystone-corrected according to the correction angle.

9. The method of claim 7, wherein, a compression ratio for compressing the projection picture projected by the projection component is determined according to a formula $$\phi = \frac{L\_1}{L\_0 * (d_1/d_0)};$$

a size of the projection picture projected by the projection component is adjusted to a size that is obtained after the projection picture projected by the projection component is compressed according to the compression ratio;

where φ is the compression ratio for compressing the projection picture projected by the projection component, L_1 is the size of the object as the projection screen, L_0 is a preset size of the projection screen, $d_1$ is a distance between the geometrical center of the projection plane and the projection component, and $d_0$ is a distance between the corresponding geometrical center of the projection plane and the projection component when the size of projection area equals the size of the projection screen.

10. The method of claim 1, wherein, the display luminance of the projection picture in the projection area on the object as the projection screen is determined according to a formula $$L\_out(x,y)=L\_in(x,y)*f(x,y,z);$$

the display luminance of the projection picture projected in the projection area on the object as the projection screen is corrected according to the determinate display luminance, where L_out(x, y) is the display luminance of the projection picture at the location corresponding to a coordinate point (x, y) in the projection area on the object as the projection screen, L_in(x, y) is the display luminance of the display picture projected at the coordinate point (x, y), and ƒ(x, y, z) denotes the integral operation and represents an integral of the three dimensional coordinate point in the 3D profile of the object as the projection screen that corresponds to the coordinate point (x, y) in the projection area on the object as the projection screen.

11. The method of claim 1, wherein the wearable apparatus is an intelligent finger ring and the object as the projection screen is a palm.

12. A device for controlling projection of a wearable apparatus that is provided with a projection component, comprising:

a 3D acquisition device disposed on the wearable apparatus, configured to acquire a 3D profile of an object as a projection screen;

a processor; and a memory that stores instructions, when executed by the processor, configured to perform operations including:

determining coordinates of vertices of a projection area on the object as the projection screen according to the 3D profile of the object as the projection screen and determining a projection plane according to the determined coordinates of the vertices; and controlling the projection according to an angle between a center line of an projection view angle of the projection component and the projection plane, a distance between a geometrical center of the projection plane and the projection component, and the 3D profile of the object as the projection screen, wherein the instructions when executed by the processor are further configured to correct a display luminance of a projection picture projected in the projection area on the object as the projection screen according to the 3D profile of the object as the projection screen at least by:

determining an extent of deformation of the projection screen through a calculation operation including an integral operation that is related to the 3D profile of the object as the projection screen; and adjusting the display luminance of the projection picture according to the extent of deformation of the projection screen.

13. The device of claim 12, wherein the instructions when executed by the processor are further configured to determine a plane with a minimum sum of variances of distances from the determined coordinates of the vertices as the projection plane.

14. The device of claim 13, wherein the instructions when executed by the processor are further configured to:

adjust a shape of the projection picture projected by the projection component according to the angle between the projection plane and the center line of the projection view angle of the projection component such that the projection picture projected onto the object as the projection screen adapts to a shape of the projection area on the object as the projection screen; and adjust a size of the projection picture projected by the projection component according to the distance between the geometrical center of the projection plane and the projection component such that the projection picture projected onto the object as the projection screen adapts to a size of the projection area on the object as the projection screen.

15. The device of claim 12, wherein the instructions when executed by the processor are further configured to:

adjust a shape of the projection picture projected by the projection component according to the angle between the projection plane and the center line of the projection view angle of the projection component such that the projection picture projected onto the object as the projection screen adapts to a shape of the projection area on the object as the projection screen; and adjust a size of the projection picture projected by the projection component according to the distance between the geometrical center of the projection plane and the projection component such that the projection picture projected onto the object as the projection screen adapts to a size of the projection area on the object as the projection screen.

16. The device of claim 15, wherein the instructions when executed by the processor are further configured to:

determine a correction angle for keystone correction of the projection picture projected by the projection component according to the angle between the projection plane and the center line of the projection view angle of the projection component; and keystone-correct the projection picture projected by the projection component according to the correction angle.

17. The device of claim 15, wherein the instructions when executed by the processor are further configured to:

determine a compression ratio for compressing the projection picture projected by the projection component according to a formula $$\phi = \frac{L\_1}{L\_0 * (d_1/d_0)};$$

adjust a size of the projection picture projected by the projection component to a size after compressing the projection picture projected by the projection component according to the compression ratio;

where φ is the compression ratio for compressing the projection picture projected by the projection component, L_1 is the size of the object as the projection screen, L_0 is a preset size of the projection screen, $d_1$ is a distance between the geometrical center of the projection plane and the projection component, and $d_0$ is a distance between the corresponding geometrical center of the projection plane and the projection component when the size of projection area equals the size of the projection screen.

18. The device of claim 15, wherein the instructions when executed by the processor are further configured to:

determine the display luminance of the projection picture in the projection area on the object as the projection screen according to a formula $L\_out(x,y) = L\_in(x,y) * f(x,y,z)$; and correct the display luminance of the projection picture projected in the projection area on the object as the projection screen according to the determinate display luminance, where L_out(x, y) is the display luminance of the projection picture at the location corresponding to a coordinate point (x, y) in the projection area on the object as the projection screen, L_in(x, y) is the display luminance of the display picture projected at the coordinate point (x, y), and $f(x, y, z)$ denotes the integral operation and represents an integral of the three dimensional coordinate point in the 3D profile of the object as the projection screen that corresponds to the coordinate point (x, y) in the projection area on the object as the projection screen.

19. The device of claim 12, wherein the wearable apparatus is an intelligent finger ring and the object as the projection screen is a palm.

20. A wearable apparatus comprising a projection component and a device for controlling projection of a wearable apparatus of claim 12.

* * * * *